W. E. MULHOLLAN.
CAMERA ATTACHMENT.
APPLICATION FILED APR. 29, 1914.
1,131,410.
Patented Mar. 9, 1915.
4 SHEETS—SHEET 1.
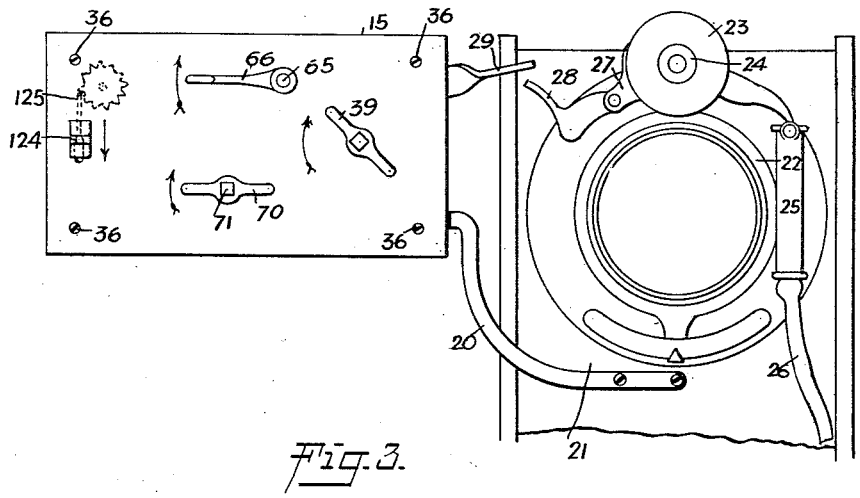
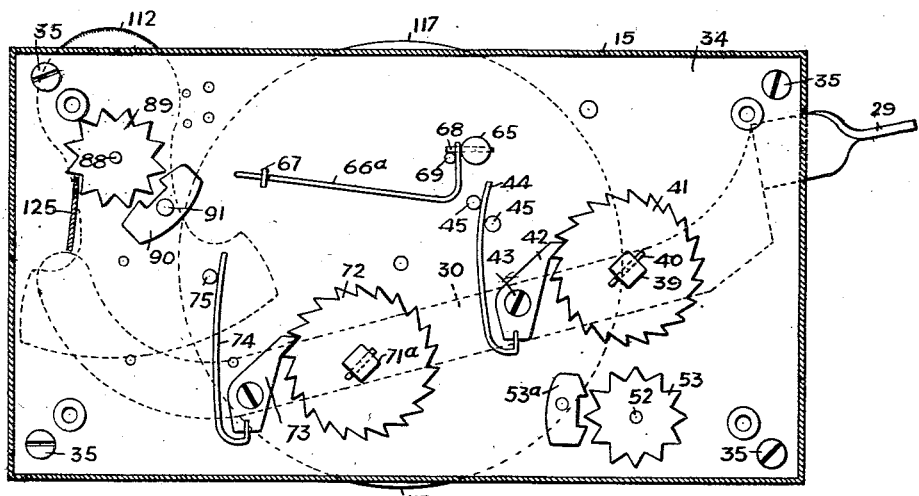
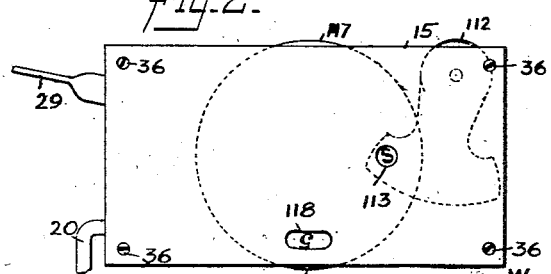
WITNESSES
William P. Goebel.
Walton Harrison.
INVENTOR
WILLIAM E. MULHOLLAN
BY
ATTORNEYS

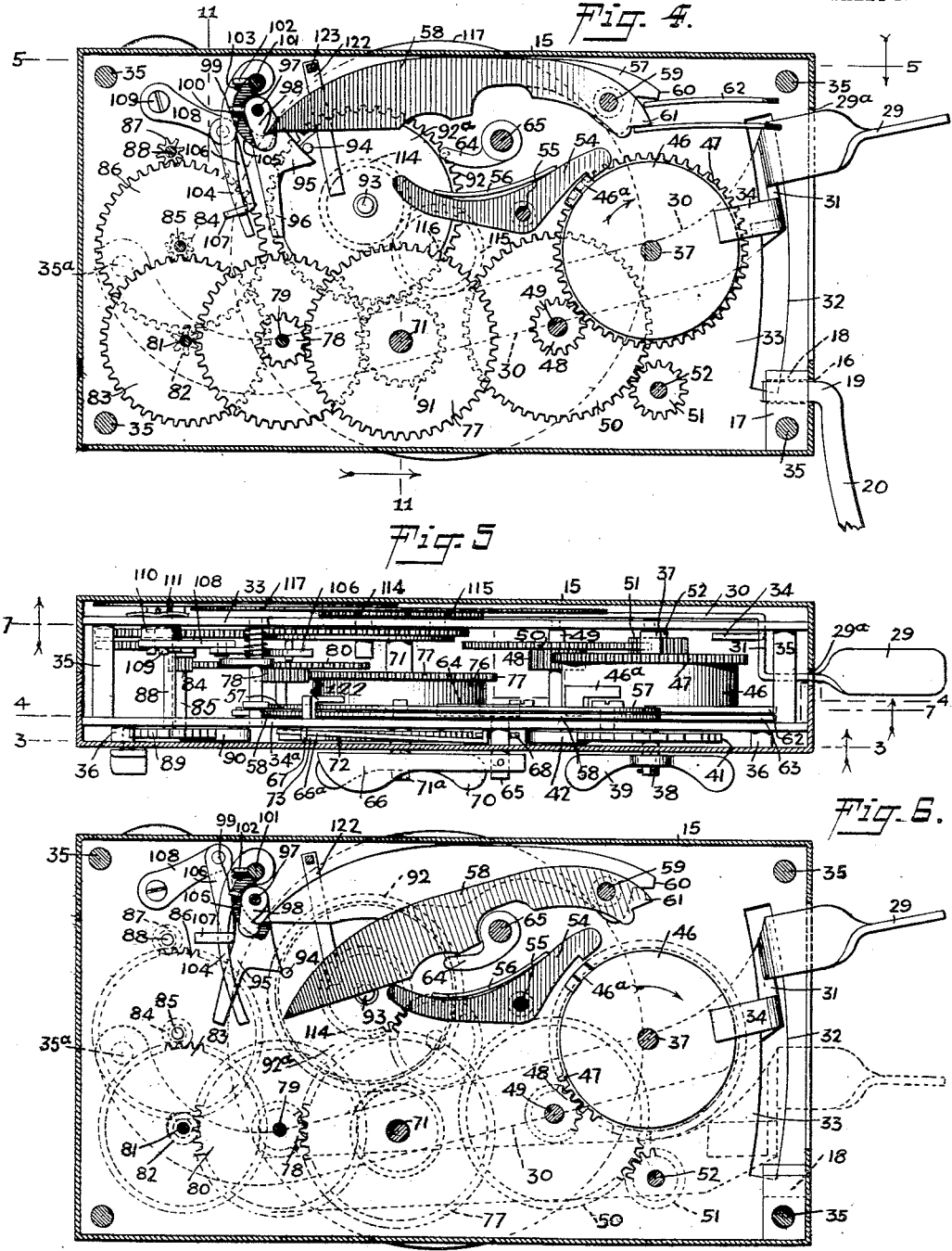

W. E. MULHOLLAN.
CAMERA ATTACHMENT.
APPLICATION FILED APR. 29, 1914.

1,131,410.

Patented Mar. 9, 1915.
4 SHEETS—SHEET 3.

WITNESSES
William P. Goebel
Walton Harrison

INVENTOR
WILLIAM E. MULHOLLAN
BY Munn&Co
ATTORNEYS

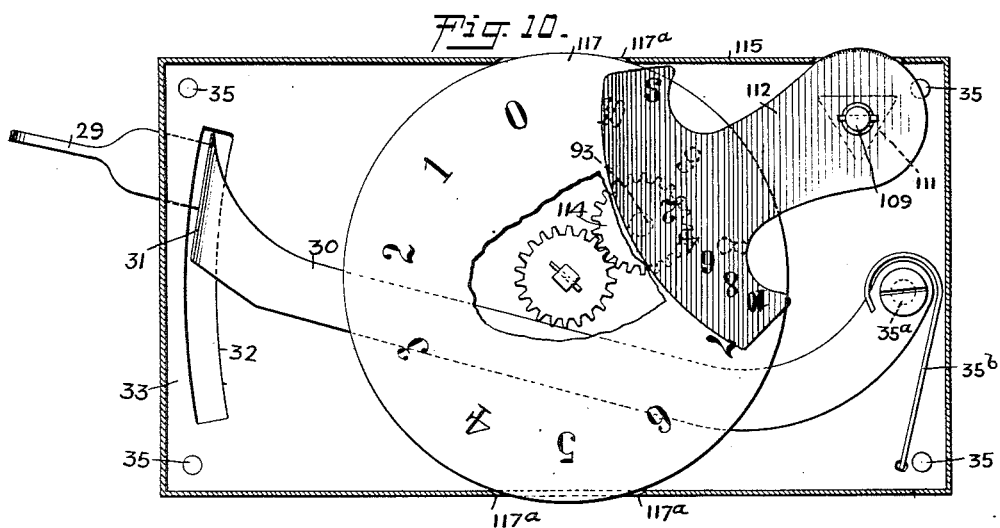

UNITED STATES PATENT OFFICE.

WILLIAM EDWARD MULHOLLAN, OF JUNEAU, TERRITORY OF ALASKA.

CAMERA ATTACHMENT.

1,131,410.  Specification of Letters Patent.  Patented Mar. 9, 1915.

Application filed April 29, 1914. Serial No. 835,137.

*To all whom it may concern:*

Be it known that I, WILLIAM EDWARD MULHOLLAN, a citizen of the United States, and resident of Juneau, Territory of Alaska, have invented new and useful Improvements in Camera Attachments, of which the following is a specification.

My invention relates to photography by aid of a camera, and more particularly comprehends an attachment for automatically operating the shutter of the camera at the expiration of a predetermined time limit, for which time limit the attachment is set beforehand, at the will of the operator.

My improved camera attachment is of especial value for enabling the operator to leave the camera for a few minutes, during or immediately preceding the time when the camera shutter is to be actuated. For instance, the operator may wish to take his own photograph, or the photograph of a group of persons in which he is included, or he may wish to arrange a background or scenery of such character as to require his constant attention, and to necessitate his getting a little distance away from the camera.

My improved camera attachment is so constructed and arranged that it may be employed for taking snap-shots, or for time exposures, or for opening the shutter after a predetermined time interval, and then either closing the shutter instantly or closing it after a predetermined time interval. For instance, the operator may desire for the camera to remain idle for five minutes in order to enable him to get into position or to arrange a scene, and he may desire a time exposure of say ten seconds, at the expiration of the five minutes.

My device can be arranged for carrying out the program just indicated, the different actions of the device being entirely automatic.

My device may be used for other purposes more or less related to those just stated. I do not limit myself therefore of any particular purpose for which the invention may be employed.

Reference is made to the accompanying drawings forming a part of this specification, and in which like letters indicate like parts.

Figure 7:
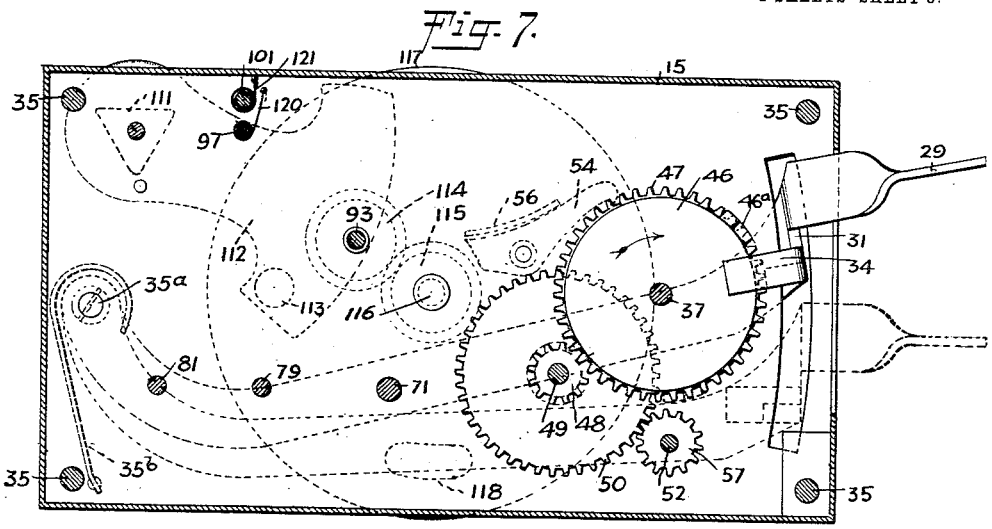
Figure 8:
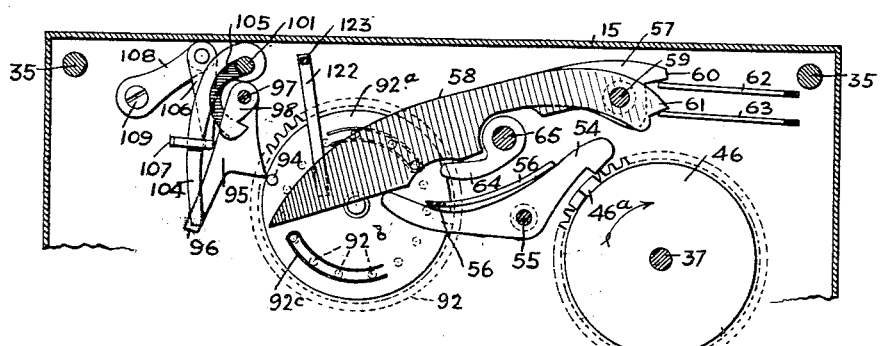
Figure 9:
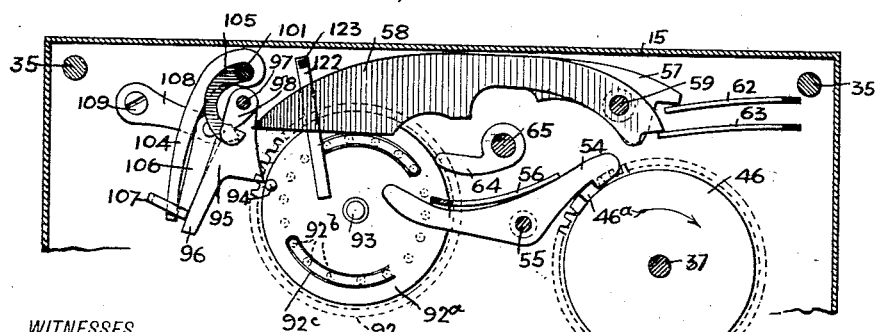

Figure 1 is a front elevation, showing my camera attachment in use upon a camera. Fig. 2 is a rear elevation of the camera attachment. Fig. 3 is a vertical section through the camera attachment casing, on the line 3—3 of Fig. 5, looking in the direction of the arrow. Fig. 4 is a section, on the line 4—4 of Fig. 5, looking in the direction of the arrow. Fig. 5 is a horizontal section on the line 5—5 of Fig. 4 looking in the direction of the arrow. Fig. 6 is a vertical section on the same line as Fig. 4, but showing certain movable parts as occupying positions different from those occupied by the same parts in said Fig. 4. Fig. 7 is a section, on substantially the same line as Fig. 6, but with certain parts removed, and various movable parts occupying positions different from those occupied in said figure. Fig. 8 is a fragmentary view, on the same line as Fig. 6, but showing certain movable parts as occupying different positions. Fig. 9 is a fragmentary section somewhat similar to Fig. 6, but showing certain movable parts as occupying positions different from those they occupied in said Fig. 6. Fig. 10 is a vertical section, taken substantially on the line 10—10 of Fig. 11, looking in the direction of the arrow. Fig. 11 is a section, on the line 11—11 of Fig. 4, looking in the direction of the arrow. Figs. 12, 13 and 14 are perspectives, showing various details of the tripping mechanism.

A casing 15, made in this instance of sheet metal, is provided with an opening 16, and with a block 17 located in one corner of the casing and provided with a hole 18 in registry with the opening 16. A bracket 20 is provided with a portion 19 for extending through the opening 16 and into the hole 18, for the purpose of supporting the casing 15 and parts carried thereby. The bracket 20, having generally the form of an arm, is mounted upon the base 21 of a camera 22. This camera is provided with a shutter 23 and with a diaphragm 24. These parts are of the usual or any desired construction. For the purpose of actuating the shutter pneumatically, I provide a pneumatic piston 25, which is connected with a flexible tube 26 in the usual or any preferred manner. The shutter 24 is actuated by a pitman 27, the latter being pivotally connected with a movable arm 28, so that the rocking of this arm controls the opening and closing of the shutter. In order to actuate the arm 28 by aid of my improved camera attachment, I provide a rocking arm 30 of considerable size, located within the casing 15 and provided with a finger 29 extending out of the casing, through a slot 29ª for the purpose. The arm is further provided with a portion 31, which extends through a slot 32 of arcuate form, with which a frame plate 33 is provided, this frame plate being located within the casing 15. The arm 30 carries a finger 34, bent substantially parallel with the plate 33, and serving as a guide for preventing the arm 30 from having undue lateral motion relatively to the plate 33. The arm 30 is journaled upon a pin 35ª and carries a leaf spring 35ᵇ, which is secured at its lower end to the plate 33, as shown in Fig. 10. Four stay pins 35 are connected with the frame plate 33, and also with a somewhat similar frame plate 34ª, as may be understood from Fig. 5. The tendency of the leaf spring 35ᵇ is to maintain the arm 30 in such position that the finger-piece 29 is at the top of the slot 29ª according to Fig. 4. The frame plate 34ª is connected by short spacing bolts 36 with the adjacent wall of the casing 15.

Extending through the frame plates 33, 34ª, and through one wall of the casing 15, is a winding shaft 37, provided with an angular head 38, and mounted upon this head is a thumb-piece 39 by aid whereof the shaft may be turned. A pin 40 (see Fig. 3) is used for retaining the thumb-piece 39 upon this angular head. Mounted rigidly upon the shaft 37 is a ratchet wheel 41. A pawl 42 engages this wheel, and is pivotally mounted upon a pin 43. A leaf spring 44 is connected with this pawl, and extends between two stop pins 45, as indicated in Fig. 3. The action of the ratchet wheel 41 and pawl 42 is such that the shaft 37 may be turned in a clockwise direction only, according to Fig. 4.

A spring barrel of ordinary construction is shown at 46, and carries a gear wheel 47. This gear wheel meshes with a gear pinion 48, which is mounted rigidly upon a shaft 49. This shaft carries a gear wheel 50, also rigidly mounted upon it, and the gear wheel 50 meshes with a gear pinion 51. This gear pinion is mounted rigidly upon a shaft 52, and the latter carries a star wheel 53. A pallet 53ª is engaged by this star wheel, and together therewith constitutes an escapement. Whenever the thumb-piece is turned in a clockwise direction according to Fig. 1, the spring in the barrel 46 is correspondingly placed under tension, and therefore tends to turn in the same direction. If the spring barrel is otherwise free, as hereinafter explained, it turns in a clockwise direction according to Figs. 4, 6, 7 and 8—the rate of its rotation being controlled by the escapement consisting of the star wheel 53 and pallet 53ª.

The barrel 46 carries an L-shaped lug 46ª, and adjacent the path of travel of this lug is a dog 54, which is mounted upon a shaft 55. A leaf spring 56 (see Figs. 8 and 9) presses upon the dog 54, and normally holds the same partially within the path of travel of the lug 46ª. Located adjacent the dog 54 are two levers 57, 58, which are journaled upon a pin 59, and which I conveniently designate as hammers. These hammers are provided with heels 60, 61 and engaging these heels are leaf springs 62 and 63, the tendency of which is to turn or rock the hammers in a contra-clockwise direction according to Figs. 8 and 9. Below the hammers 57, 58 is a dog 64, somewhat eccentric in form, and mounted rigidly upon a rocking shaft 65. A hand lever 66 is mounted rigidly upon this shaft, and is used for rocking the same. A spring 66ª is secured by a fastening 67 to the frame plate 34, and engages a pin 68 extending diametrically through the shaft 65. The pin 68 is adapted to lodge against a stationary pin 69, carried by the frame plate 34, and constituting a limiting stop for preventing excessive rotary travel of the shaft 65, as may be understood from Fig. 3. Whenever the hand lever 66 is grasped by hand and turned slightly in a clockwise direction according to Fig. 1, the dog 64 engages the hammers 57 and 58, and forces them out of engagement with the dog 54. The hammers 57 and 58, being thus raised, are temporarily secured in position as hereinafter described.

A thumb-piece 70 is carried by a winding shaft 71, which for this purpose is provided with a square head 71ª. Secured rigidly upon the winding shaft 71 is a ratchet wheel 72, and engaging this ratchet wheel is a pawl 73. A leaf spring 74 is secured to this pawl and engages a stop pin 75, as shown more particularly in Fig. 3.

A spring barrel 76 is revolubly mounted upon the shaft 71, and carries a gear wheel 77, the latter being also revoluble relatively to the shaft. The gear wheel 77 meshes with a gear pinion 78, the latter being mounted rigidly upon a shaft 79. A gear wheel 80 is also mounted rigidly upon this shaft. This gear wheel meshes with a pinion 82, the latter being secured rigidly upon a revoluble shaft 81. A gear wheel 83 is secured to this shaft, and meshes with a gear pinion 84, the latter being secured upon a revoluble shaft 85. Secured also upon this shaft is a gear wheel 86, which meshes with a gear pinion 87, the latter being mounted rigidly upon a shaft 88. This shaft carries a star wheel 89, serving as a scape wheel, and having the form indicated in Fig. 3. Adjacent this scape wheel is a pallet 90, mounted upon a stationary pin 91 and adapted to rock. The scape wheel 89 and pallet 90 together constitute an escapement.

Mounted rigidly upon the shaft 71 and disposed parallel with the gear wheel 77 is a gear pinion 91, and meshing with this pinion is a gear wheel 92, which is loosely mounted upon a stub shaft 93 carried by the frame work. A disk ratchet wheel 92$^a$ is mounted rigidly upon the shaft 93, and carries a pin 94. The gear wheel 92 has arcuate ratchets 92$^b$ cut in it, and the disk ratchet wheel 92$^a$ carries a pair of spring lugs 92$^c$, which act as pawls and are adapted to engage these ratchets. The disk ratchet wheel 92$^a$ can turn without affecting the gear wheel 92, but when the gear wheel 92 turns, it causes the disk ratchet wheel 92$^a$ to turn to the same extent, and the pin 94 is thus moved orbitally around. That is to say, rotation of the ratchet wheel 92$^a$ causes the pin 94 to move around, and the ratchet wheel 92$^a$ is turned by the gear wheel 92.

Located adjacent the gear wheel 92, and normally disposed partially within the path of travel of the pin 94, is a rocking arm 95 having the form indicated more particularly in Fig. 13, and provided with a finger 96 forming practically a continuation of this rocking arm. A rocking shaft 97 supports this rocking arm, upon which it is rigidly mounted, this shaft being journaled in the frame work. The rocking shaft 97 carries a dog 98 rigid relatively to it, and also carries a radially projecting pin 99. This pin engages another pin 100, carried by the frame work and constituting a limiting stop for preventing the shaft 97 from rocking beyond a predetermined limit in a contra-clockwise direction according to Fig. 4. Adjacent the shaft 97 is another shaft 101, journaled in the frame work and carrying a radially projecting pin 102. Another pin 103, carried by the frame work and parallel with it, may be engaged by the pin 102 (see Fig. 4) and thus serves as a limiting stop for preventing excessive travel of the shaft 101, when the latter is rocked in a contra-clockwise direction according to Fig. 4. An arm 104 is mounted rigidly upon the rocking shaft 101, and extends downwardly therefrom. A dog 105, also mounted rigidly upon the shaft 101, extends a slight distance downwardly from the same. An arm 106 is provided with an eye 107 of the form shown more particularly in Fig. 14, and this eye encircles the arm 104. The arm 106 is pivotally mounted upon another arm 108, the latter being rigidly secured upon a rocking shaft 109. This rocking shaft extends through the plate 33 and also through a friction leaf 111 of substantially triangular form, and also through a collar 110. This collar is secured rigidly upon, and forms a part of, an indicator lever 112. This indicator lever is secured rigidly to the rocking shaft 109, and held firmly in position by virtue of pressure exerted by the friction leaf 111 against the frame plate 33. The indicator lever 112 carries a number of graphic symbols, which in this case consist of numerals 2 to 10 inclusive, and the legend S. The numerals shown upon the lever are for the purpose of designating and indicating the number of seconds desired for the exposure of the object to be photographed. The legend 3 is for the purpose of designating, and also indicating, a mere instantaneous exposure— in other words, a snap-shot.

The casing 15 is provided with a slot serving as a peep hole 113 for the purpose of exhibiting some one of the legends carried by the indicating lever, as may be understood from Fig. 2. That is to say, when the indicating lever is set, as hereinafter described, so as to exhibit through the hole 113, the legend S or one of the numerals carried by the indicator lever, and the camera attachment is thereafter actuated as herein described, there will be an exposure which is either instantaneous, or continuous for a definite and predetermined number of seconds, as the case may be.

Mounted rigidly upon the stub shaft 93 is a gear wheel 114, and meshing with the latter is another gear wheel 115 carried by a revoluble shaft 116, to which it is rigidly secured. The revoluble shaft 116 also carries an indicating dial 117 which is provided with graphic symbols or legends, preferably numerals zero to 10 inclusive, as indicated in Fig. 10. The casing 15 is provided with a peep hole 118 of substantially arcuate form, as indicated in Fig. 2, and through this peep hole the legends or graphic symbols carried by the indicator dial 117 may be observed, as the dial is turned—only one legend, however, being exposed when the dial is set, as hereinafter described. The dial 117 extends slightly through the top and bottom walls of the casing, which are for this purpose provided with slots 117$^a$. The purpose of the indicator dial 117 is to enable the operator to regulate or control the time during which the shutter mechanism of the camera is to be maintained idle, before the exposure, and after the attachment is properly set.

The shafts 97 and 101 are connected with retractile springs 120, 121 as indicated in Fig. 7, and by aid of these springs the shafts normally tend to turn contra-clockwise according to Fig. 7. In doing this, they tend to keep the dogs 98 and 105 extending to the right according to Figs. 4, 6, 8 and 9. Such being the case, these dogs serve as triggers for holding the hammers 57 and 58, except when the dogs are forced out of engagement with these hammers. The parts are so arranged that when the gear wheel 92 is turned, in a clockwise direction according to Figs. 4, 6, 7, 8 and 9, the pin 94, by engagement with the rocking arm 95, causes this arm to rock in a clockwise direction according to these figures, and thus causes the dog 98 to disengage the hammer 58. The rocking movement of the arm 95 also causes the arm 104 to rock, provided the eye 107 happens to be properly positioned, for this purpose, relatively to the arm 104. The position of the eye 107 relatively to this arm is controlled by the angular position of the arm 108, and this arm may be set to different angles, as elsewhere described. In order to guide the hammers 57, 58 in true paths, I provide a substantially L-shaped guide 122, which is secured rigidly upon the frame plate 34ª. This guide is held in position by a reduced portion 123, which extends through a hole in the frame plate 34ª and is riveted within said hole.

A slide 124 carries a member 125 for engaging and disengaging a scape wheel 89, in order to prevent movement of this scape wheel and gearing connected therewith when the slide occupies its normal position, as indicated in Fig. 1.

As may be understood from the foregoing description, the device includes essentially two separate motor mechanisms; one actuated by the spring barrel 46 and the other by the spring barrel 76, each of these motor mechanisms being provided with a train of clockwork and an escapement. Moreover, the train of clockwork driven by the spring barrel 46 is controllable by the other train of clockwork mentioned, in the sense that it is stopped and started by movements thereof. It will also be noted that when both of the hammers 57 and 58 are released at the same time, the dog 54 is only tripped once, and consequently the arm 29 makes only one complete stroke downward and upward. When, however, the hammers 57, 58 are released one at a time, as is the case when time exposures are made, the dog 54 is actuated twice, and the arm 29 makes two complete downward and upward strokes— one stroke opening the shutter and the next stroke closing the same—the interval between these strokes being controllable by the position of the eye 107 relatively to the arm 104, as elsewhere explained, and therefore being controllable by the arbitrary position into which the indicator lever 112 is placed, at the will of the operator. It will be observed, moreover, that the operator, by grasping the indicator dial 117 and turning the same to expose different numerical legends carried by it, can regulate the interval of time required for the pin 94 (see Fig. 4) to reach the arm 95 and actuate the same. Hence, by adjusting the indicator dial 117, the device may be set to actuate the arm 30 until after the expiration of a predetermined interval—say three, four or five minutes. It will readily be observed, therefore, that in setting the camera attachment for the time interval just mentioned, it may be arranged to either take a snap-shot or a time exposure, as desired—the work of the attachment, when once properly set, being entirely automatic.

The operation of my device is as follows: The attachment being mounted in any suitable manner upon a camera, for instance as indicated in Fig. 1, the parts are so adjusted that the lever 28 of the camera shutter is disposed partially within the path of travel of the end portion 29 of the arm 30—the parts being so arranged that the movement of the arm 30 is just sufficient to control the shutter. This being done, the camera is focused and otherwise arranged as if the operator intended to press the button by hand, in the usual manner. The indicator dial 117 is next set by hand, so as to display through the opening 118 (see Fig. 2) a legend indicating the number of minutes which the operator desires to elapse before the camera shutter is to be moved. If, now, the exposure desired be a time exposure, of say five seconds, the operator places his thumb upon the exposed portion of the indicator lever 112, and turns or rocks this lever until the proper legend, indicating the time exposure, is displayed through the opening 113, as will be understood from Fig. 2. If, however, a snap-shot instead of a time exposure is desired, the indicator lever is moved into such position that the legend displayed through the opening 113 is the letter S. These steps having been accomplished, the operator grasps the thumb-piece 39, and by turning it clockwise, winds the spring within the spring barrel 46. He next grasps the thumb-piece 70, and by turning it clockwise he similarly winds the spring contained within the spring barrel 76. He next grasps the lever 66, and turns it in a clockwise direction. This turns the shaft 65, and causes the dog 64 to lift the hammers 57, 58, so as to bring them into engagement with the dogs 98 and 105. The slide 124 is next moved in the direction indicated by the arrow in Fig. 1. This liberates the clockwork driven by the spring barrel 76 and including the scape wheel 89. As this clockwork is thus actuated, the disk ratchet 92ª, forming a part of the clockwork in question, is turned so that the pin 94 engages the arm 95. This rocks the shaft 97, and so disengages the dog 98 from the hammer 58. If the device has been set for a time exposure, as above described, the eye 107 will have such position that, when the arm 95 presses against it, the arm 104 will be moved after the gear wheel turns a predetermined distance; in other words, after the lapse of a definite number of seconds. This means, of course, that first the hammer 58 is released by a dog 98, and two, four, six, eight or ten seconds afterward the hammer 57 is released by the dog 105. As the hammer 58 is released, it is driven downwardly by pressure of the spring 63, and strikes the adjacent end portion of the dog 54. This dog is thus lifted out of engagement with the lug 46ª, and the gear wheel 47 is left free to turn. The dog 54, therefore, instantly recovers its normal position, owing to the action of the spring 56. The rotation of the wheel 46 causes the lug 46ª to lodge against the portion 34 of the arm 30, and this arm thereupon makes one complete stroke to and fro. The blow of the hammer 58 upon the dog 54 is given instantaneously and therefore by the impact of the hammer, the resistance offered by the spring 56 is overcome. After the hammer blow is thus administered, the dog 54 is again engaged by the lug 46ª, thus bringing the gear wheel 46 to a stop. The liberation of the hammer 57 now takes place. This hammer strikes the dog 54 and the wheel 46 is again liberated by the tripping of the dog 54, so that the arm 30 now makes a second complete stroke to and fro. These movements of the arm 30, by controlling the action of the camera shutter, give the time exposure desired.

In the event of a snap-shot being desired and the device being set accordingly, the eye 107 is so positioned that movement of the arm 95 causes a simultaneous movement of the arm 104, the result being that the two shafts 97 and 101 are rocked simultaneously, and the dogs 98 and 105 are simultaneously released from the hammers 58 and 57, the two hammers both striking the dog 54 at the same instant, and as a consequence, the gear wheel 46 is liberated only once. The arm 30 makes a single complete stroke to and fro, the camera shutter being actuated accordingly.

I do not limit myself to the precise mechanism shown, as variations may be made therein without departing from the spirit of my invention.

Having thus described my invention, what I claim as new and desire to secure by Letters Patent is as follows:

1. In a camera attachment, the combination of a casing, an arm journaled thereupon and movable relatively thereto, said arm being provided with a portion for engaging a shutter lever, a train of clockwork provided with means for shifting said arm back and forth in order to actuate said shutter lever, a dog for restraining movement of said train of clockwork, a hammer for striking said dog in order to cause said dog to release said train of clockwork, means for actuating said hammer, and time controlled mechanism for actuating said means.

2. In a camera attachment, the combination of a casing, an arm pivotally mounted within said casing and adapted to swing relatively thereto, a train of clockwork, a dog for starting and stopping said clockwork, a plurality of hammers for striking said dog in order to actuate the same, means for actuating said hammers in order to enable them to strike, separate restraining devices for preventing said hammers from striking, and time controlled mechanism for liberating said restraining devices at predetermined time intervals.

3. A device of the character described, comprising a movable member for actuating a camera shutter, a train of clockwork provided with means for actuating said movable member, an escapement connected with said train of clockwork, means including a movable dog for stopping and starting said train of clockwork, hammers for striking said dog in order to actuate the same, springs for actuating said hammers, time controlled mechanism for liberating said hammers at different moments, and indicating mechanism for disclosing the time interval between which said hammers are liberated.

4. A camera attachment, comprising a casing, a movable member connected thereto and provided with a portion for engaging a shutter lever, clockwork for actuating said movable member, means for actuating said clockwork, means including a movable dog, for stopping and releasing said clockwork, a pair of separate hammers, each adapted to strike said dog, in order to actuate the latter, a separate spring engaging each hammer, and time-controlled mechanism for liberating said hammers at different moments.

5. A device of the character described, comprising a movable member for actuating a camera shutter, a train of clockwork provided with means for actuating said movable member, means including a movable dog for stopping and releasing said train of clockwork, hammers for striking said dog in order to actuate the same, means for conferring motion upon said hammers, and time-controlled mechanism for liberating said hammers at different moments.

6. A camera attachment, comprising a casing, a movable member connected thereto and provided with a portion for engaging a shutter lever, clockwork for actuating said movable member, means for actuating said clockwork, mechanism for stopping and releasing said clockwork, a pair of separate hammers each adapted to control said means for actuating said clockwork, means for placing said hammers in condition, and time controlled mechanism for liberating said hammers at different moments.

7. A camera attachment, comprising a movable member for actuating a camera shutter, a train of clockwork provided with means for actuating said movable member, means including a pair of hammers for separately releasing said train of clockwork, means for placing said hammers in condition, and time controlled mechanism for liberating said hammers at different moments.

In testimony whereof I sign my name to this specification in the presence of two subscribing witnesses.

WILLIAM EDWARD MULHOLLAN.

Witnesses:
   A. W. Fox,
   S. J. Holt.